United States Patent [19]
Dummermuth

[11] 3,710,222
[45] Jan. 9, 1973

[54] NUMERICAL CONTROL SERVO DRIVE SIGNAL GENERATING SYSTEM

[75] Inventor: Ernst Dummermuth, East Cleveland, Ohio

[73] Assignee: Allen-Bradley Company, Milwaukee, Wis.

[22] Filed: Jan. 15, 1971

[21] Appl. No.: 106,684

[52] U.S. Cl. ................318/604, 318/594, 318/601, 318/636
[51] Int. Cl. .............................................G05b 19/28
[58] Field of Search......318/594, 600, 601, 618, 603, 318/604, 596

[56] References Cited

UNITED STATES PATENTS

| | | | |
|---|---|---|---|
| 3,206,665 | 9/1965 | Burlingham | 318/603 X |
| 2,928,033 | 3/1960 | Abbott | 318/604 |
| 3,419,775 | 12/1968 | Kandos | 318/596 |

*Primary Examiner*—T. E. Lynch
*Attorney*—Lindenberg, Freilich & Wasserman

[57] ABSTRACT

In a numerical control system the following error or distance to the end point is expressed as a binary number. This binary number is inspected and if above a certain value an offset number is added in order to obtain a desired transfer characteristic from digital to analog converter to which the digital number is to be applied. This new binary number is converted into an analog voltage which is used to drive the servo motor of a numerical control, point to point, or contouring, system. Depending upon the magnitude of the binary number to be converted, the digital to analog converter is switched between different resolutions to generate a smooth dynamic response and to provide high gain for small binary numbers.

6 Claims, 10 Drawing Figures

3,710,222

NUMERICAL CONTROL SERVO DRIVE SIGNAL GENERATING SYSTEM

BACKGROUND OF THE INVENTION

This invention relates to numerical control systems and more particularly to improvements in generating drive signals for the prime mover of a numerical control system.

Most of the presently used numerical control contouring systems employ phase modulated feedback. They usually employ two counters. One of these is a command counter, and the other is a reference counter. The reference counter is driven by the output of a resolver which in turn is driven in response to the shaft rotation of one of the machine tool drives. The command counter is driven in response to pulses which are added or subtracted from the basic clock frequency applied to the command counter input.

In operation, command pulses from a contour generator cause add or subtract modulation whereas the reference counter is driven by the resolver feedback. The phase difference between the resolver feedback as exemplified in the reference counter count and the command counter count, is converted into a drive signal which causes the prime mover to move in such a direction as to reduce the phase difference between the counters. The maximum allowable following error depends upon the counter length whereas the sample frequency for determining counter feedback is inversely proportional to the counter length.

OBJECTS AND SUMMARY OF THE INVENTION

A feature of this invention is to provide a numerical control system wherein the difference between a commanded advance rate and the actual velocity is expressed as a binary member.

Another feature of this invention is the provision of a system which converts a binary member representative of the difference between a commanded position and an actual position into an analog voltage using a digital to analog conversion technique.

Another feature of this invention is an arrangement for adjusting the resolution of a digital to analog converter as a function of the binary member to be converted.

These and other objects of the invention may be achieved in an embodiment of the invention by inspecting the magnitude of the binary number to be converted and if it is larger than a predetermined value another number, called an offset number, is added thereto to secure a desired transfer function and in order to avoid discontinuity in the transfer function desired of the digital to analog converter used to convert this number to an analog voltage.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
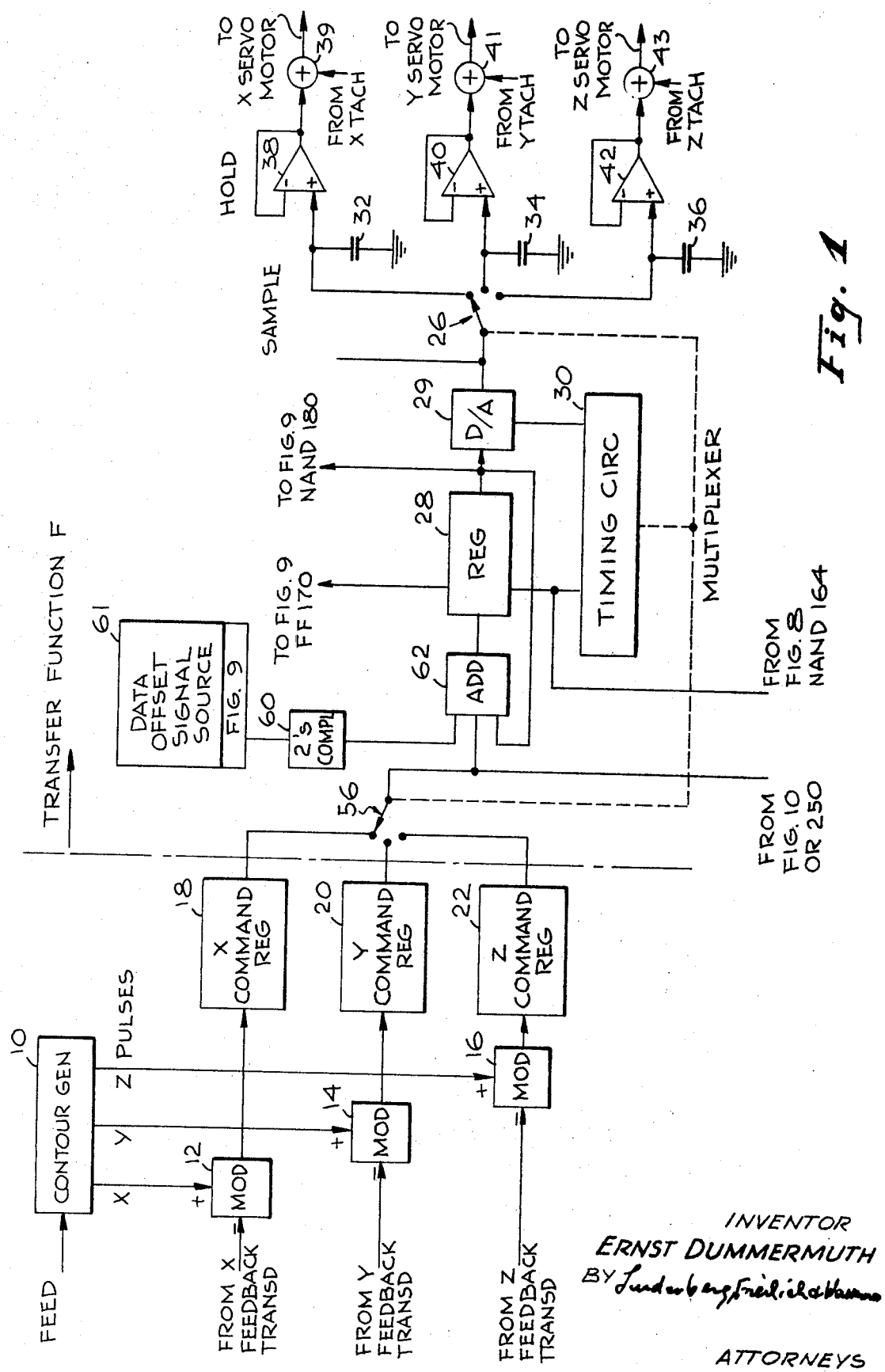
FIG. 1 is a block diagram embodying this invention and illustrating elements employed in a contouring system.

FIG. 1 is a block diagram of a portion of a contouring system which includes an embodiment of this invention. A contour generator 10 provides output pulse trains, corresponding to desired movements in the X, Y and Z directions for simultaneous operation of these respective axes. For the purpose of simplification, the operation of a single axis will be described, from which the others will be readily understood.

X command pulses from the contour generator and X feedback pulses from a transducer driven by the prime mover for the X axis is applied to a modulator 12, which separates the two inputs on an alternate time base and sends the difference together with the proper sign information to a command register 18. Circuits to achieve this pulse separation are well known and are usually called an anticoincidence summer.

The apparatus thus far described is well known and employed in numerical machine tool contouring machines.

In accordance with this invention the command register 18 is made as an $n$ bit recirculating shift register, using binary coding as the number system. The number in the register 18 is either incremented or decremented in accordance with the output of the modulator 12. The register contains an error signal $e$ which is in the form of a binary number. It is entered into the following circuitry when the switch 56, driven by a multiplexer, shown later herein, is connected to the output of the register 18.

Switch 56 is ganged with a switch 26 which is operated in synchronism therewith. The circuitry between switches 56 and 26, which is circuitry in accordance with this invention, converts the following error into an analog signal. This analog signal is applied via switch 26 to a capacitor 32, which samples and holds the signal and then applies it to an operational amplifier 38. The output of the operational amplifier is connected to a summer 39, having as a second input the usual output of the X tachometer driven by the X axis prime mover. (not shown) The output of the summer 39 is used to drive the X axis prime mover. For the Y and Z axes, modulators respectively 14 and 16 are provided as well as command registers 20 and 22. Also, there are provided sample and hold capacitors 34, 36, and operational amplifiers 40, 42, and summers 41 and 43.

The conversion circuitry includes an adder 62, which receives the output of the command register, to which switch 56 is connected. This number is entered into the register 28, which is a circulating register. The circulating register then circulates this number and adds to it the true number or the 2's complement of a data offset number, when required, as will be described in more detail later herein.

The data offset number is provided from a data offset signal source 61. The meaning of the data offset number will become more clear as this explanation progresses. The timing circuit 30 besides clocking the operation of the register 28 also controls the operation of a digital to analog converter 29. This D/A circuit serially converts the number in the register into an analog voltage which is sampled by means of the switch 26 and capacitors 32, 34 and 36.

Figure 2:
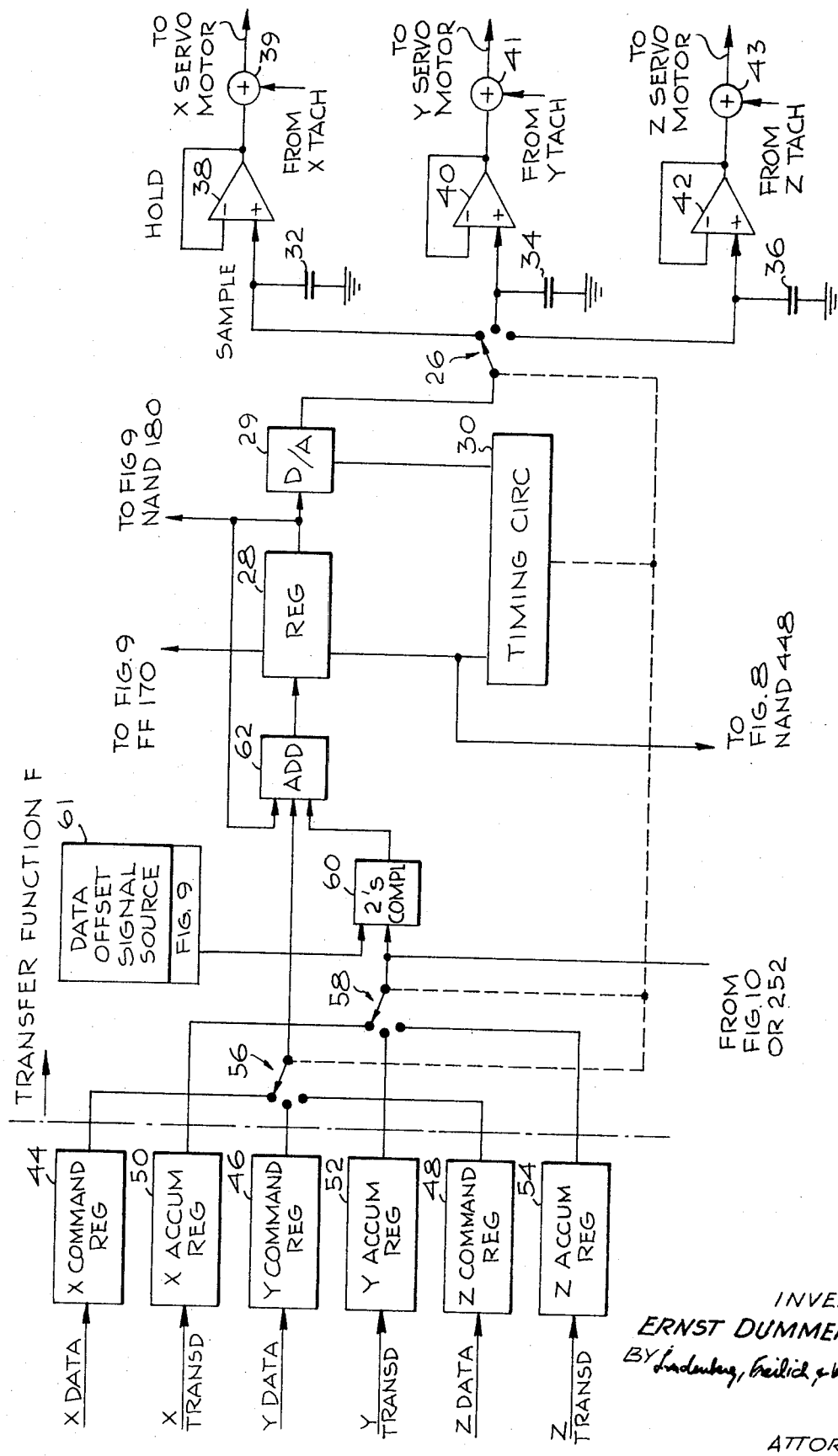
FIG. 2 is a block diagram embodying this invention and illustrating elements employed in a point to point system.

FIG. 2 is a block diagram of so much of a point to point numerical control system as to enable one to determine in which area the circuitry in accordance with this invention is used. Here again, an error signal e is generated and applied to the conversion circuitry, which is the same as is shown in FIG. 1, and thus has the same reference numerals applied thereto. In a point to point system, the system is commanded to go to a new absolute position. An X command is entered into an X command register 44 while the current position of the machine tool table is kept in the X accumulator register. These are both recirculating shift registers. Switches 56 and 58 respectively connect the output of the X command register when it is being recirculated to an input to an adder 62 which also receives the output of the X accumulator register through a 2's complementor 60. Thus, the output of the adder 62 is the difference between the two, or is a binary number indicative of the distance which the machine tool has yet to travel. This is entered into the recirculating register 28. The contents of the recirculating register 28 are then circulated through the adder 62 which at this time receives as its other input the true number of the 2's complement of the offset signal from the offset signal source 61.

The register output is then entered serially into the digital to analog converter 29, being timed by the same type of timing circuit 30 as is used to time the circulation of register 28, to convert the binary number in the register into an analog signal. The analog signal is then applied to a sample and hold circuit consisting, as before, of a capacitor 32 and an operational amplifier 38. The output of the operational amplifier is applied to a summer having as its other input the output from the X tachometer.

Switches 56, 58 and 26 are all operated by a multiplexer circuit which will be described subsequently herein. There is provided a Y command register 46 and a Y accumulator register 52 for the Y axis. A Z command register 48 and a Z accumulator register 54 are provided for the Z axis. Also, sample and hold circuits are provided for the respective Y and Z axes comprising the capacitor 34 operational amplifier 40 and capacitor 36 and operational amplifier 42.

Figure 3:
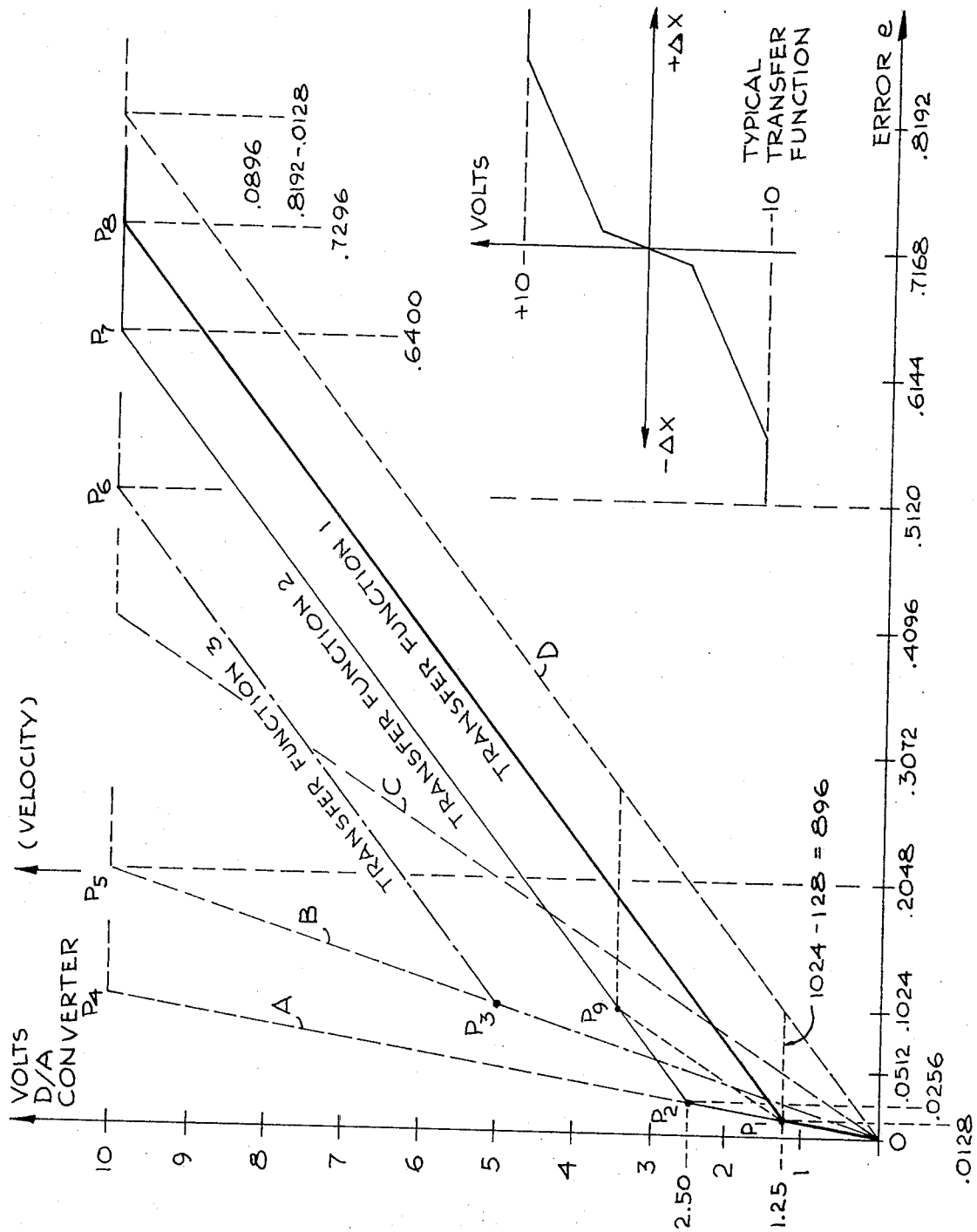
FIG. 3 is a graph illustrating the actual output voltage of a D/A converter as a function of the input binary number, or the D/A converter transfer function.

FIG. 3 is a graph illustrating the D/A converter voltage output versus the error signal $e$, represented as a binary number. The D/A converter can be connected to resolve 10, 11, 12 or 13 binary places. Other resolutions of course may be obtained in a similar way. The different resolutions are indicated with the dashed lines A, B, C and D and can be interpreted as different gain settings. Transfer functions 1, 2 and 3 will now be discussed. It is the purpose of these transfer functions to provide a much smoother servo response and yet to provide high gain around zero speed.

In a contouring system, the binary number from the abscissa of FIG. 3 represents the following error $e$ whereas the ordinate may also be interpreted as a tachometer voltage. This may be understood from the fact that the sum of the sample and hold voltage and a tachometer voltage at any one of the summers must zero out at the summing point. Therefore FIG. 3 is also a representation of velocity versus following error.

The basic idea is to maintain a high gain for lower velocities which inherently results in a very accurate part; however, to allow more following error in the higher velocity ranges where a machine is primarily used for rapid traverse and rough cuts. Considering transfer function 3 and assuming a maximum velocity of 200 IPM (at relative ordinate 10) it will be noted that a tight following error (slope B) is maintained up to a velocity of 100 IPM (ordinate 5) then the slope changes and is parallel to slope D. Thus, increasing the following error above a certain velocity has the effect of reducing the acceleration forces.

The energy stored in the moving system is $e = \frac{1}{2} \cdot m \cdot v^2$ and this energy has to be dissipated during deceleration and has to be provided during acceleration.

To find the maximum torque requirements, the points with the largest deceleration constant have to be evaluated. In FIG. 3, P5 is evaluated using a 200 IPM to zero IPM step. The slope from P5 to the origin (slope of B) which determines the gain of the converter is the ratio ordinate/abscissa or 200 IM/0.2048 I, thus, $P_5$: $(200 \ I/M/0.2048 \ I) \cdot 200 \ I/M \approx 200,000 \ I/M^2$ Evaluating $P_6$ using the same 200 IPM to zero IPM step $P_6$: $(200 \ I/M/0.8192 \ I) \cdot 200 \ I/M \approx 50,000 \ I/M^2$ and $P_3$ with 100 IPM to zero step $P_3$: $(200 \ I/M/0.2048 \ I) \cdot 100 \ I/M \approx 100,000 \ I/M^2$ As a result by using Transfer Function 3 the high deceleration constant found for $P_5$ does not apply, the necessary torque requirement for point $P_5$ is eliminated and the systems maximum torque requirement is reduced to one-half at point $P_3$.

Assuming a system with 400 IPM top velocity and following Transfer Function 2, then the peak torques are proportional to the decel. constants in points $P_7$ and $P_2$.

$P_7 = (400 \ I/M/0.8192 \ I) \cdot 400 \ I/M \approx 200,000 \ I/M^2$ $P_2 = (400 \ I/M/0.1024 \ I) \cdot 100 \ I/M \approx 400,000 \ I/M^2$ However $P_4 = (400 \ I/M/0.1024 \ I) \cdot 400 \ I/M \approx 1,600,000 \ I/M^2$ As can be seen, Transfer Function 1 provides even lower values $$P_8 \approx 200{,}000 \ I/M^2$$

$$P_1 \approx 200{,}000 \ I/M^2$$

However, $P_4 \approx 1{,}600{,}000 \ I/M^2$

In this last case, the peak torque occurs twice. Because of the breakpoint $P_1$ occurs at 50 IPM velocity, Transfer Function 1 would primarily be applied to point-to-point positioning machines.

It must be appreciated that the velocity values used in explaining the operation may be scaled by a constant factor and that FIG. 3 is a normalized diagram to cover these variations.

To accelerate a system from zero speed to 400 IPM following Transfer Function 1 or 2 would require: a 1,600,00 I/M² top acceleration constant at the origin of FIG. 3. However, by tolerating some dynamic excess following error during the start-up period, the motor torque can be kept much lower.

Figure 4:
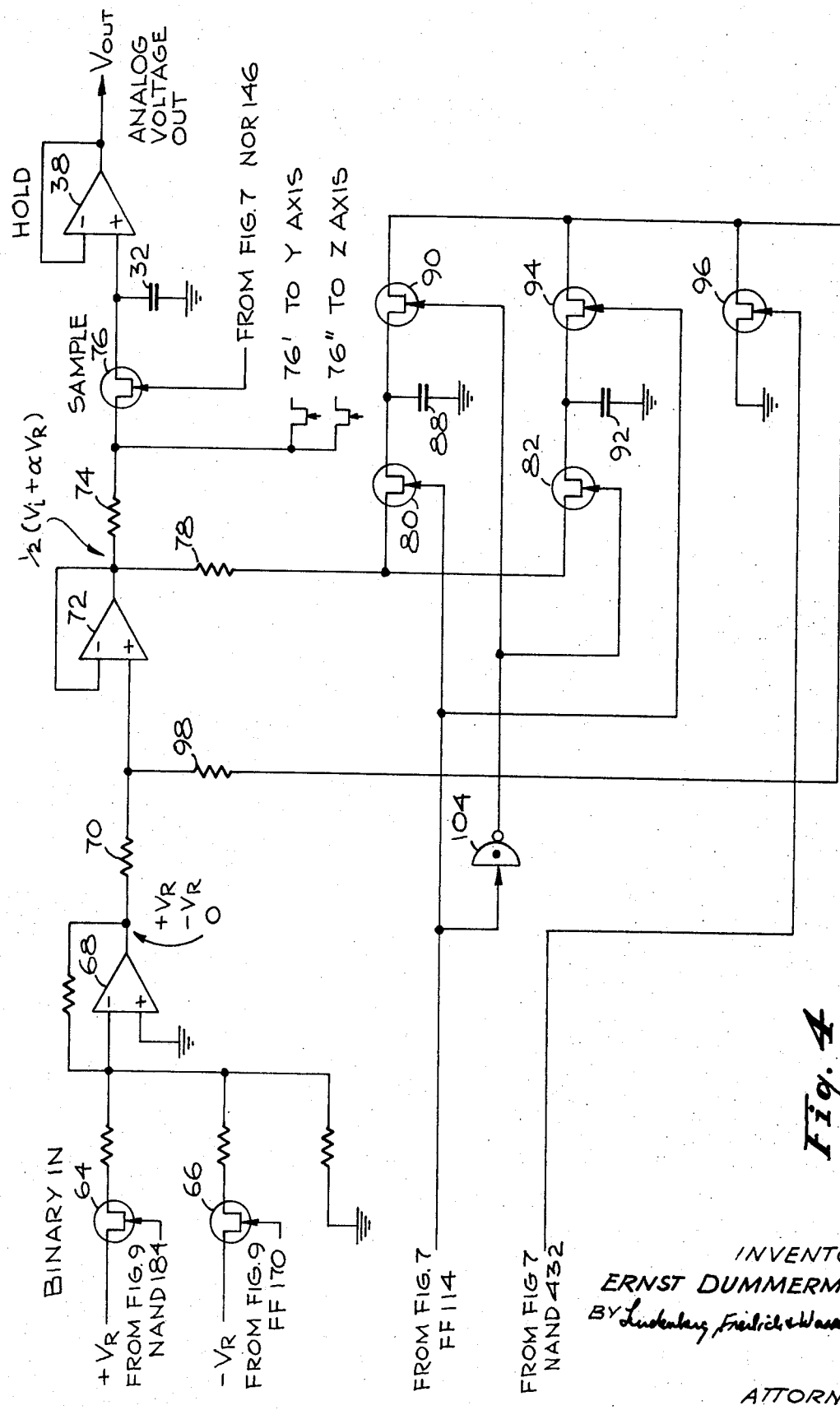
FIG. 4 is a schematic diagram of a serial D/A converter employed in this invention.
Figure 9:
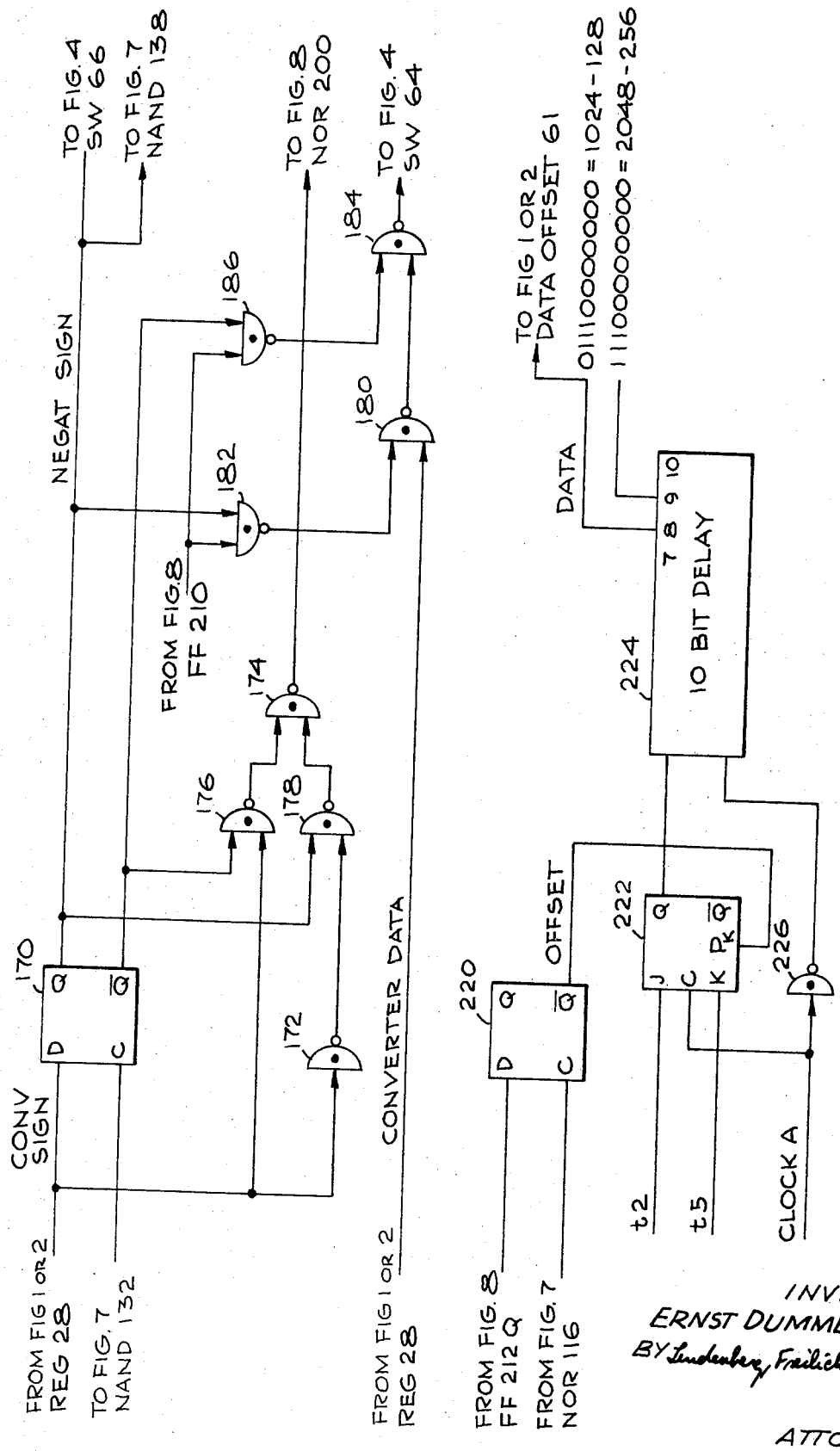
FIG. 9 is a block diagram of a circuit which determines the algebraic sign of the binary number and generates an offset number.

FIG. 4 is a circuit diagram of a cyclic digital to analog converter +VR and −VR are reference voltages. Data to be converted is applied in serial form LSB first from a source such as register 28 to a transistor switch circuit 64. FIG. 9 shows the details of the source of data. In the presence of 1's the switch 64 is turned on to apply VR to the following circuitry. In the presence of zeros it remains off. The algebraic sign of this data is also applied to a switch 66 and remains applied during the entire time data is being applied to the switch 64. By using 2's complement arithmetic, a bipolar signal is obtained at the output of the operational amplifier 68, to the input of which are connected the two switch inputs.

The output of the operational amplifier 68 is applied through a precision resistor 70, to the input of another operational amplifier 72. This operational amplifier output is applied through a resistor 74 to a sample switch 76 and through another resistor 78 to two switches 80 and 82. Switch 80 connects to a capacitor 88 and to a following switch 90. Switch 82 connects to a capacitor 92 and to a following switch 94. A bus connects the outputs of switches 90, 94 and a shorting switch 96 back to the input of the operational amplifier 72 through a resistor 98. Switches 80, 90, 82, and 94 and 96 are all controlled by timing signals derived from a timing circuit shown in FIG. 7.

The switch 76 corresponds to switch 26 in FIG. 1 or 2, being a solid state version. The output of switch 76 is applied to a sample and hold circuit consisting of capacitor 32 and an output operational amplifier 38. Switch 76 is turned on by a timing signal derived from FIG. 7. The output of the operational amplifier 38 is the analog voltage output corresponding to the digital number input.

With switch 96 initially turned on, the input of the operational amplifier 72 equals 1/2 of the output voltage of operational amplifier 68. Switches 90, 82 and 80, 94 alternate in their operation during the shift process. After every shift pulse the resultant voltage at the input of the operational amplifier 72 equals $$V_{i+1} = \tfrac{1}{2}(V_i + \alpha V_r),$$

Where $V_i$ is the voltage stored on one of the capacitors 88 or 92, $V_r$ is the reference voltage applied to the input switch 64, and $\alpha$ may be 0 or 1 depending upon the data being converted.

Assume now that the voltage $V_i$, corresponding to the analog voltage obtained from all previous bits, is stored on capacitor 92, then by operating switches 80 and 94, the voltage across capacitor 92 is applied through switch 94 to the input to operational amplifier 72 where it is added to the new voltage value coming from the output of amplifier 68. The sum is then stored on capacitor 88. The value of the charge on capacitor 88 equals the value $V_{i+1}$. During the next shift pulse, capacitors 88 and 92 exchange their role.

After a complete conversion of the binary data, the resultant DC voltage is transferred by switch 76 to the capacitor 32. Capacitor 32 with its impedance transformer, which is operational amplifier 38 is provided on a per axis basis.

Binary digital numbers to be converted by this D/A converter are shifted in, least significant bit first. For every "one" bit, ½ $V_R$, the reference voltage, is added to the contents of whichever of the storage capacitors 88, 92 is receiving input at the time. For every zero in the binary digital number being converted, the value of the voltage transferred from one of the capacitors 88 to the other, 92 is reduced by one-half.

The resolution of this D/A converter is defined as a timing signal, applied to the sample switch 76. This signal enables the sample and hold circuit comprising capacitor 32 and operational amplifier 38 to store the $V_{i+1}$ voltage after a certain number of bits have been converted. In accordance with this invention, the timing signal will be applied at different binary bit positions depending upon the magnitude of the binary number to be converted.

According to the conversion formula given for this D/A converter, the binary number 128 applied to a 10 bit D/A converter produces the same analog voltage as the number 1024 applied to a 13 bit D/A converter. Therefore, numbers less than 128 are converted, using a 10 bit D/A converter. If numbers 128 and larger are converted using a 13 bit D/A converter, this number must be offset to look like 1024 or larger in order to avoid discontinuities in the transfer function. Generally, the difference 1024−128 = 896, must be added to every number exceeding 127 while applying a 13 bit D/A conversion.

It will be shown that in accordance with this invention one of the slopes shown in FIG. 3, is selected, depending upon the magnitude of the binary number, and an offset number is generated so that these slopes may be fitted together without discontinuities. If the corrected number exceeds the resolutions specified (i.e. 13 bits can only hold 8191) a constant DC voltage will be generated, (saturation).

Since positive as well as negative binary numbers are converted to either a positive or a negative analog voltage, the circuit which is provided either adds or subtracts the offset number depending upon the sign of the original number being positive or negative.

Figure 5:
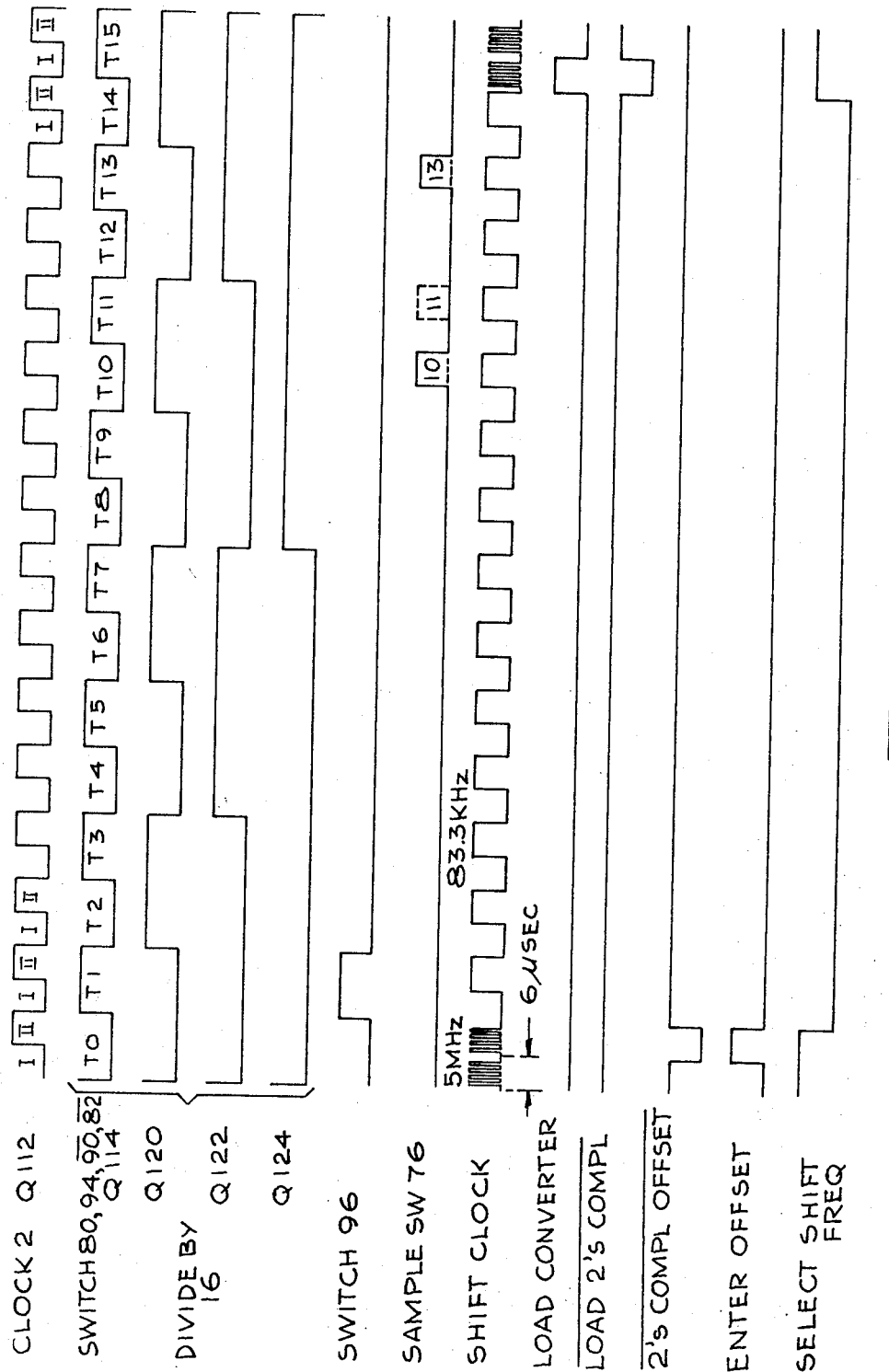
FIGS. 5 and 6 are timing waveform diagrams shown to assist in understanding of the operation of this invention.
Figure 6:
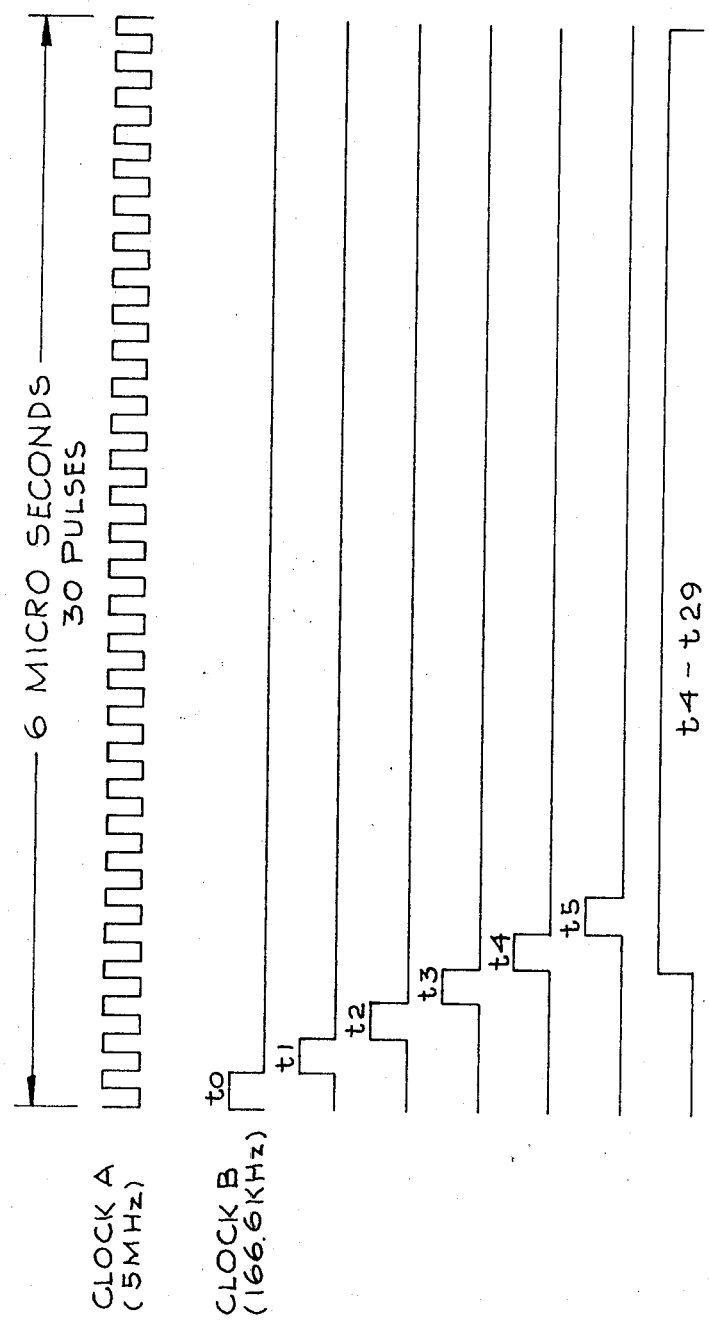
Figure 8:
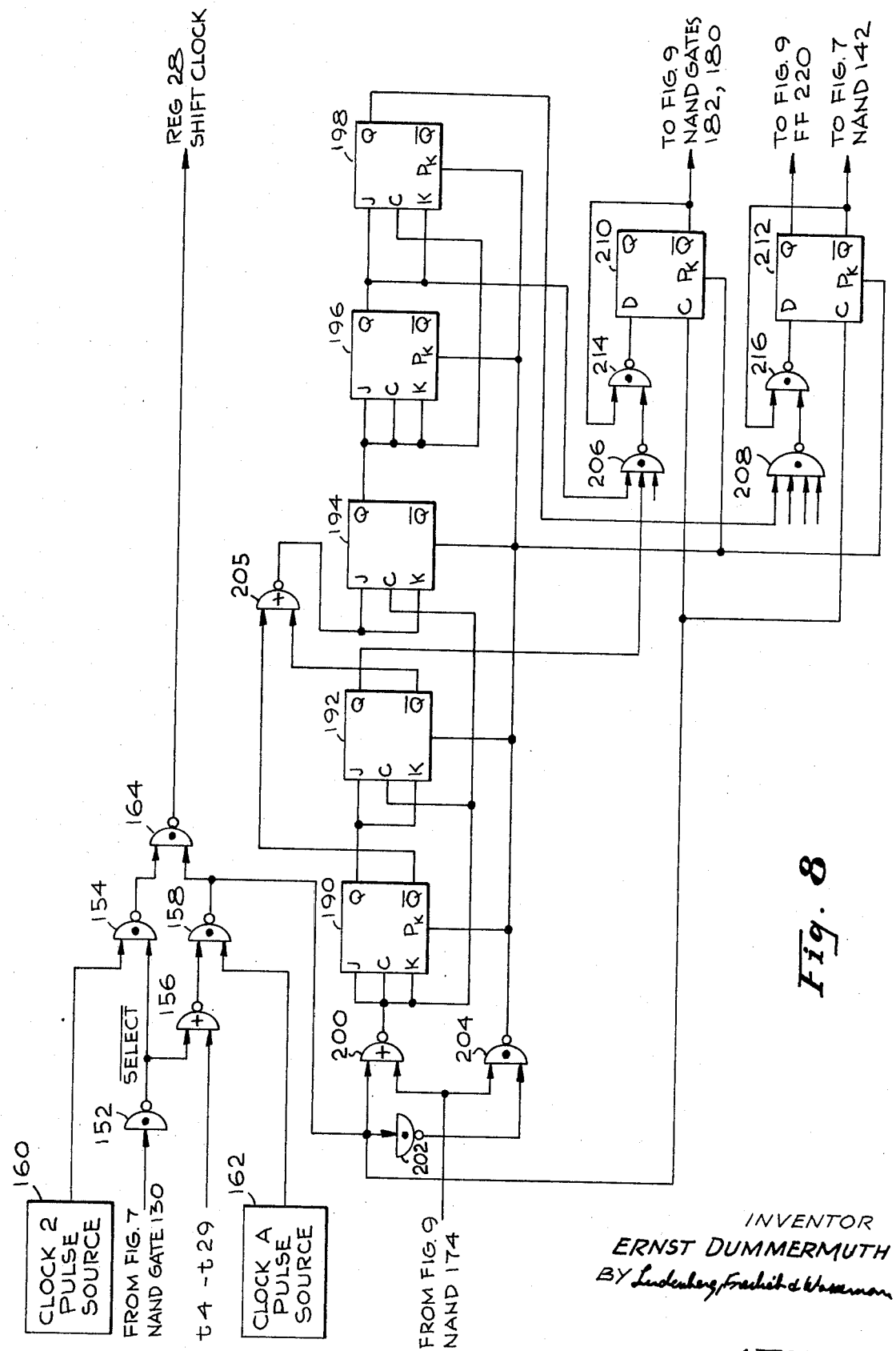
FIG. 8 is a block diagram of the circuit which determines the magnitude of a binary number being converted into an analog number.
Figure 10:
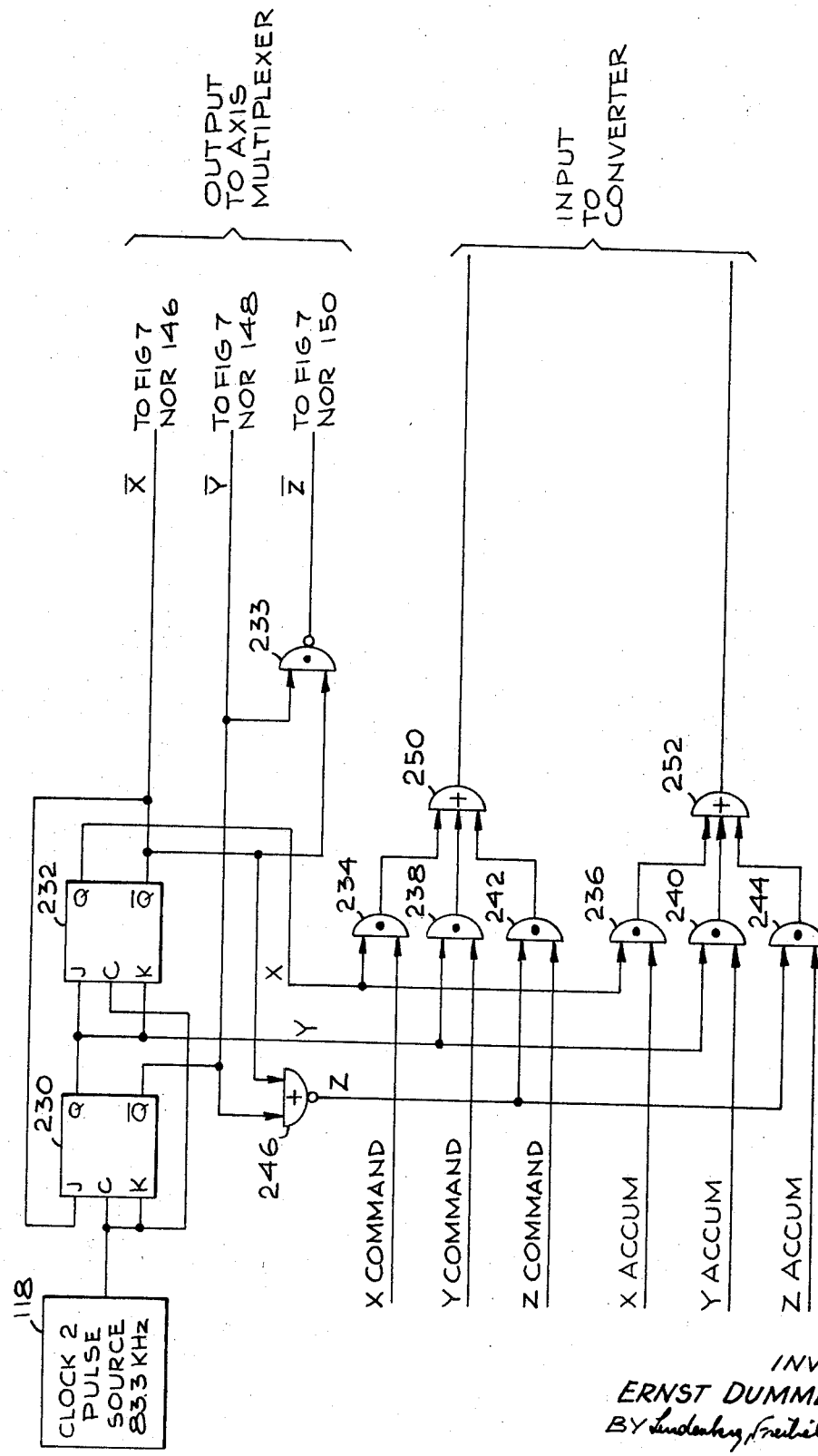
FIG. 10 is a block diagram illustrative of a multiplexing circuit which can be employed in this invention.

FIGS. 5 and 6 are timing diagrams which show the sequence of operation of the analog circuit shown in FIG. 4 and which also are of assistance in understanding the operation of circuits shown in FIGS. 8, 9 and 10. FIG. 6 is a timing diagram illustrative of the cycling of the registers 18 and 28 shown in FIGS. 1 and 2. The shift registers 18 are recirculating every 6 microseconds or in accordance with clock A and the shift frequency of 5 MHz. Thus, the register 28 must also shift at the same frequency.

From FIG. 5, the timing of the operation of switches 80, 94 and 90, 82 may be seen. When the signal applied to these switches goes high, which is at times T1, T3, etc., switches 80 and 94 are operated. When the switching signal goes low, at times T0 T2, etc., the inverter 104 (FIG. 4) connected between the input line and the switches 90 and 82 enables these switches to be operated. Switch 96 is turned on to reset the circuit for the next conversion. Sample switch 76 is turned on at whatever time is determined from the size of the binary number being converted for establishing the resolution of the D/A converter.

The shift clock waveform shown in the center of the FIG. 5 has two distinct frequencies. One of these is a 5 MHz clock for entering information and for manipulation of this data. The other one is an 83.3 KHz clock which is used to shift the data through the converter.

Figure 7:
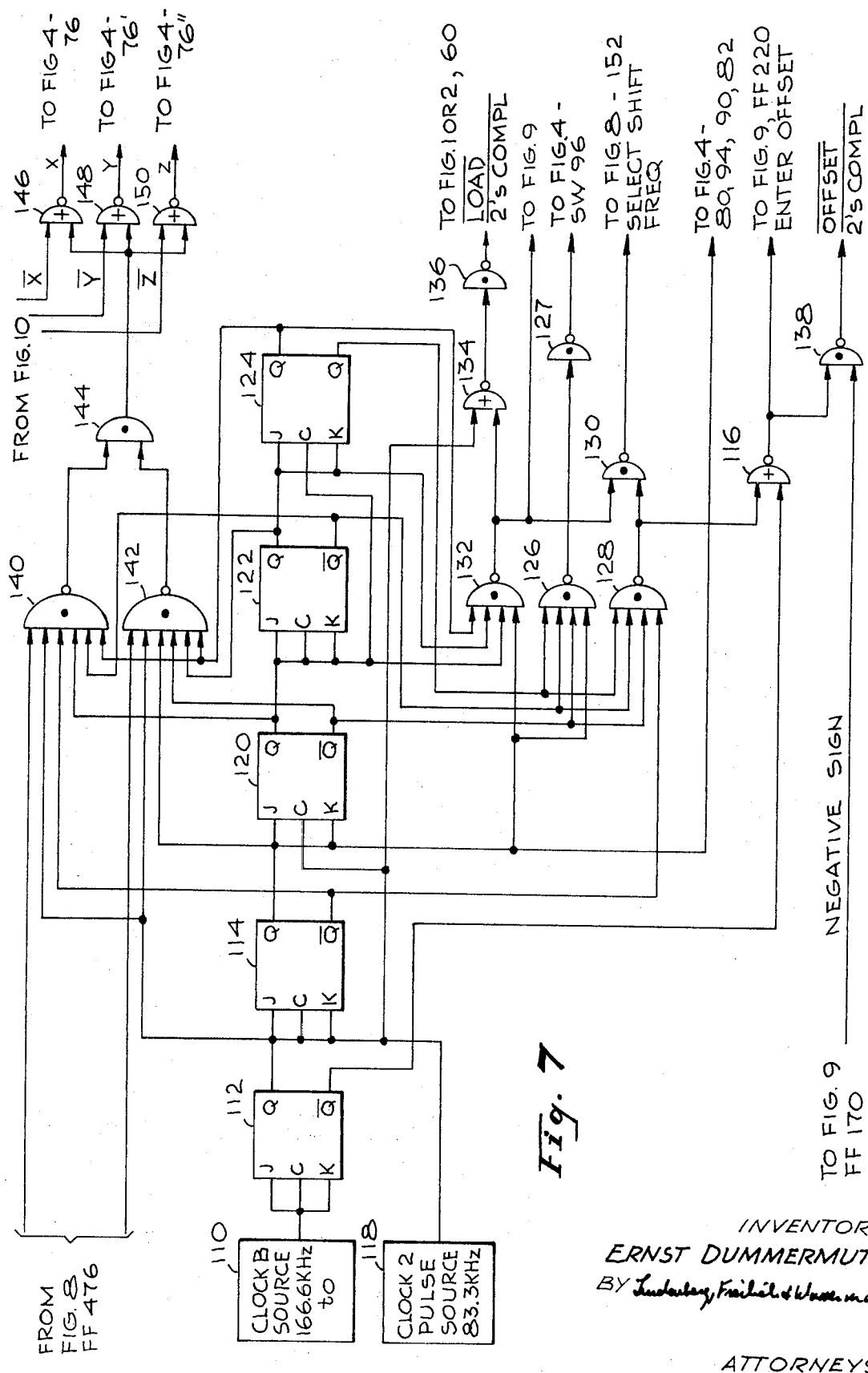
FIG. 7 is a block diagram of circuits used to produce the timing diagram of FIG. 5.

FIG. 7 shows the circuitry for generating a timing diagram of FIG. 5. A "clock B" pulse source 110, waveforms for which are shown in FIG. 6, (166.6 KHz), drives a JK flip-flop 112. The Q output of this flip-flop is applied to the C, J and K input of the JK flip-flop 114, the $\overline{Q}$ output of this flip-flop 112 is applied as an input to a NOR gate 116. The Q output of JK flip-flop 112 generates a square wave called clock 2 pulse source 118, which from FIG. 5 may be seen to be an 83.3 KHz pulse frequency. The Q output of flip-flop 114 enables the J and K inputs of JK flip-flop 120. The clock 2 source 118 is also applied to the clock input of flip-flop 120. The Q output of flip-flop 120 is used to drive a flip-flop 122. The Q output of flip-flop 122 drives a flip-flop 124. As a result, the flip-flop 114, 120, 122, 124 comprise a 16 circuit.

The Q output of flip-flop 114 constitutes the switch 80, 94, $\overline{90}$, $\overline{82}$ signal (see FIG. 4). The switch 96 signal is generated by a NAND gate 126, which drives an inverter 127. The required inputs for qualifying NAND gate 126 are the Q output of flip-flop 114, the $\overline{Q}$ output of flip-flop 120, the $\overline{Q}$ output of flip-flop 122, and the $\overline{Q}$ output of flip-flop 124. A NAND gate 128, is qualified in the presence of a $\overline{Q}$ output from all of the flip-flops 114, 120, 122 and 124. Its output is applied to NOR gate 116 whose output constitutes the signal "enter offset" shown in FIG. 5 and applied to a flip-flop 220 in FIG. 9. The output of NAND gate 128 is also applied to a NAND gate 130 whose output selects either a 5 MHz or an 83.3 KHz shift frequency as shown in FIG. 8. The waveform of this signal is shown on the bottom of FIG. 5.

A NAND gate 132 is qualified in the presence of the Q signals of flip-flops 114, 120, 122, and 124. Its output qualifies NAND gate 130 whose output has already been described. The output of NAND gate 132 serves as one input to a NOR gate 134 whose output is designated as "load converter", which enables data flow across switches 56 and 58 (FIGS. 1 and 2). The same signal from NOR gate 134 is inverted by open collector inverter 136 and qualifies the two's complementor 60 associated to the data path of switch 58 or the data offset source 61 (FIG. 2). The signal designated as offset two's complement is provided by a NAND gate 138, receiving as one input the output of NOR gate 116 and as the other qualifying input an output from a flip-flop 170 representing the binary number negative sign derived from the circuit shown in FIG. 9. The outputs of NAND gate 136 and NAND gate 138 are connected together to provide a "wire-or" function.

A NAND gate 140 is qualified in the presence of a Q signal from flip-flops 112, 120, 124, a $\overline{Q}$ signal from flip-flop 114, 122 and finally in the presence of a Q signal derived from FIG. 8, flip-flop 212.

A NAND gate 142 is enabled in the presence of a Q output from flip-flops 112, 114, 122, 124, a $\overline{Q}$ output from flip-flop 120, and finally in the presence of a $\overline{Q}$ signal from flip-flop 212 in FIG. 8. The outputs of these two NAND gates, respectively 140 and 142, are applied to an AND gate 144. AND gate 144 output is one input to three NOR gates respectively 146, 148, and 150. The outputs of these NOR gates constitute the respective sample switch signals 76 applied to the three sample switches 76 at the output of the D/A converter being used for the respective X, Y and Z axis.

The clock B signal which is 166.6 KHz is divided by 2 by flip-flop 112 and thereafter divided by 16 by the following flip-flops 114, 120, 122 and 124. Therefore every interval of the 16 stages equals 12 microseconds. The Q outputs of these flip-flops is shown in the upper half of FIG. 5 designated as the switch 80, 94, $\overline{90}$ and $\overline{82}$ signals as well as the divide by 16 signals. NAND gate 140 decodes a binary 10 whereas NAND gate 142 decodes a binary 13. Either the binary 10 or binary 13 is selected by a flip-flop in FIG. 8 in order to change the resolution of the digital to analog circuit. The selected sample pulse via AND gate 144 is sent to the analog switch 76 of the selected axis at either T10 or T13 times.

NAND gate 132 and NOR gate 134 generate the load convert signal during the previous count of T15. At the same time the two's complement signal is generated by means of the inverter 136.

NAND gate 126 and inverter 127 provides switch 96 signal during time T1.

The data offset signal operates to modify the binary number to be converted. For example, considering in FIG. 3 the transfer function 1, the error signal e is inspected and if e is larger than 127 (P1) then an offset number $1024 - 128 = 896$ is added to the original error signal e. The increased error signal will enable the D/A converter to follow along transfer function 1 instead of following the path to $P_2$ and $P_4$. The "enter offset" timing signal is qualified by the outputs of NAND gate 128 and NOR gate 116. If the original number was negative then the offset number will be entered negative too. NAND gate 138 which controls the two's complementor and inverter 136 are connected to a common terminal to enable such addition of negative numbers to take place.

FIG. 8 is a circuit employed to determine the magnitude of the binary number which is to be applied to the D/A converter. The select shift frequency signal, which is the output of NAND gate 130 (FIG. 7) is inverted by the inverter 152 and then applied to a NAND gate 154. The output of the inverter 152 is also applied to a NOR gate 156, the output of which is supplied to a NAND gate 158. NOR gate 156 also has applied to it a signal extending from t4 to t29 (see FIG. 6). NAND gate 154 has as a second input "clock 2" pulses from a "clock 2" pulse source 160. NAND gate 158 has as its second input "clock A" pulses from a clock A pulse source 162.

In the presence of a "select shift frequency" signal, a NAND gate 164 will provide as its output 5 MHz "clock A" pulses. In the absence of the signal the output of NAND gate 164 will be the 83.3 KHz "clock 2" signals. These are the shift clock signals shown in FIG. 5 and are used to shift register 28 shown in FIGS. 1 and 2.

To determine the magnitude of the error signal number, its algebraic sign is first looked at to see whether the number is positive or negative. If the error signal $e$ is positive, the number of leading zeros is an indication of the magnitude. If the error signal $e$ is negative (in two's complement form) the number of leading one's is indicative of the magnitude of $e$.

The processing of the sign information is shown in FIG. 9. A terminal 165 connects to the sign stage of the register 28, (FIGS. 1 or 2) and the terminal 167 connects to the output end of the register 28 (FIG. 1 or 2). Thus, at the outset the sign signal in the register 28 is entered into the flip-flop 170 causing it to be set. The Q output of flip-flop 170 is applied to switch 66 in FIG. 4 wither enabling the switch or disenabling the switch depending upon the switch sign. This sign signal is also applied to NAND gate 138 in FIG. 7, and is indicative of a negative sign, enables the two's complement offset to become active.

To turn leading one's also into leading zeros, inverter 172 inverts the signal applied thereto and thereby the output of NAND gate 174, which is selected by the NAND gates 176 and 178, will always be a positive error $e$. Therefore, only the number of leading zeros have to be counted. It should be noted that NAND gate 176 has as its second qualifying input the $\overline{Q}$ output of flip-flop 170 and NAND gate 178 has as its second qualifying input the Q output of flip-flop 170. The output of NAND gate 174 is the input to an upcounter (flip-flops 190–198), shown in FIG. 8. Since the register 28 circulates its data, the first signal seen by terminal 165 will be a sign signal and thereafter will constitute the data which is being recirculated least significant bit first. Thus, after one recirculation of the data all of the leading one's or zeros will have passed by terminal 165.

Terminal 167, which is connected to the output of the register 28 sees the data as it is being recirculated least significant bit first. This is applied to a NAND gate 180 which has as its second qualifying input the output of a NAND gate 182. NAND gate 182 has one input connected to the Q output of the flip-flop 170 and a second input is received from a "saturate" flip-flop on FIG. 8.

The output of NAND gate 180 is applied to another NAND gate 184, which has as its second input the output of a NAND gate 186. NAND gate 186 also has one input derived from a "saturate" flip-flop, shown in FIG. 8 and the other input is derived from the $\overline{Q}$ output of flip-flop 170. The output of NAND gate 184 is applied to the data input switch 64. In the absence of a saturate signal applied to terminal 222, the binary number coming from register 28 is transmitted to switch 64 through the two NAND gates 180 and 184 in the same form as it appears at the output of the register 28. The presence of a saturate signal qualifies two NAND gates 182 or 186 whereby the signal to the A/D converter (output of NAND gate 184) appears as all one's, for positive saturation or as all zero's for negative saturation depending upon the state of flip-flop 170.

Referring to FIG. 8 again, flip-flops 190, 192, 194, 196, and 198 constitute an up counter into which are entered the binary number which is being recirculated through register 28. It is entered least significant bit first and each time a one appears, the up counter is reset. Shift pulses are provided by clock A at 5 MHz.

In operation, binary data is received from the output of NAND gate 174. This is applied to a NOR gate 200. The NOR gate 200 is connected to the clock input terminal of the flip-flop 190. NOR gate 200 also receives the clock pulses. The clock pulses are also applied from the output of NAND gate 158 through an inverter 202 to a NAND gate 204. The output of NAND gate 204 resets the counter. Accordingly, in the presence of a one binary bit, NAND gate 204 is enabled and the up counter is reset. In the presence of a zero NAND gate 204 is not enabled, and the clock pulse advances the counter by one count. Therefore, at the end of a recirculation cycle, the binary number in this up counter represents the number of leading zeros. NOR gate 205 has as its inputs the $\overline{Q}$ outputs of flip-flops 190 and 192 and its output controls the J and K inputs of flip-flop 194 to achieve a synchronous operation of flip-flop 194. NAND gate 206 is connected to decode the count of 10, (23 − 10 = 13), since transfer function one should saturate at $2^{13} = 8192$. NAND gate 208 is connected to decode the count of 16, (23 − 16 = 7) to determine the location of the break point $P_1$, ($2^7 = 128$). The length of register 28 is 26 bits. By taking the sign bit as data source the first two shift pulses are used to bring the LSB to the input of the up counter, furthermore, flip-flops 210 and 212, which are driven by the outputs of AND gates 206 and 208 must be qualified one bit ahead. Therefore, the decoding is based on 23 and not on 26. NAND gate 206 drives flip-flop 210 through a NAND gate 214. The other input to NAND gate 214 is the $\overline{Q}$ output of flip-flop 210. NAND gate 208 drives flip-flop 212 through a NAND gate 216 whose other input is a $\overline{Q}$ output of flip-flop 212. The $\overline{Q}$ output of flip-flop 210, going high, constitutes a saturate signal. For binary numbers exceeding 8191, the $\overline{Q}$ terminal output of flip-flop 210 is high. For binary numbers exceeding 127, the $\overline{Q}$ output of flip-flop 212 is high.

Thus, from the circuitry just described one establishes the magnitude of the error signal as well as whether or not the break point has been reached. NAND gates 140 and 142 respectively in FIG. 7 determine the slope and saturation point of the transfer function. This will be appreciated from the fact that these NAND gates in addition to their timing inputs from the counter shown in FIG. 7 respectively receive the Q and $\overline{Q}$ outputs or breakpoint indicating outputs. NAND gate 208 is used to determine the breakpoint. The Q terminal of flip-flop 212 is high and thus since the error $e$ is less than 128, no offset is applied.

Returning again to FIG. 9, it will be seen that the Q output of flip-flop 212 is connected to the D input of a flip-flop 220 while the enter offset output of NOR gate 116 in FIG. 7 is connected to the C input of the flip-flop 220. If the flip-flop is set by the output of the flip-flop 212, then, it will be remembered that the error $e$ is less than 128 and no offset is applied. Flip-flop 222 is used to generate the offset number. This is done by driving flip-flop 222, in response to clock A and applying the output to a 10 bit delay register 224. A 10 bit delay register is also advanced in response to clock A being applied through an inverter 226. The offset number is generated by applying a $t2$ pulse to the J input of the flip-flop whereby flip-flop 222 is set and one's will be entered into the 10 bit delay until a $t5$ pulse is applied to the K input of flip-flop 222 at which time it is reset, entering zeros into the 10 bit delay. Thus, the number derived from the 10 bit delay terminal will either be the number 1024 − 128, derived from the eighth output of the 10 bit delay or the number 2048 − 256 derived from the nineth output of the delay. One or the other of these offset numbers depending upon the desired slope, is added to the error signal (see FIG. 1) after the predetermined break point value of the error signal has been exceeded.

The output of flip-flop 220 holds flip-flop 222 reset forcing the number in the shift register to be zeros in the presence of an input from flip-flop 212 in FIG. 8.

The output from terminal 8 of the 10 bit delay constitutes the offset which is added into the error signal through the adder 62 shown in FIGS. 1 and 2. The new error ($e$ + offset) is now checked for its magnitude again entering the leading zeros into the up counter shown in FIG. 8.

The saturation point is again defined for ($e$ + offset) being greater than or equal to 8192. According to the characteristic shown in FIG. 3 "transfer function 1" saturates at $e = 0.7296. = 0.8192 - 0.0896$.

The saturation flip-flop 210 in FIG. 8 and its $\overline{Q}$ output which is applied to NAND gates 182 and 186 in FIG. 9 will cause one's to be applied to the switch 64 for ($e$ + offset) equal to or greater than 8192 or zeros for ($e$ + offset) equal or less than −8192. For all other cases the converter data will be inverted twice using NAND gates 180 and 184.

FIG. 10 is a circuit diagram of an input and output multiplexer which may be used with this invention. Flip-flops 230 and 232 constitute a divide by three circuit which is driven from the clock 2 pulse source 118, which is 83.3 KHz. The first, second and third outputs of the divide by three counter are respectively applied to NOR gates 146, 148 and 150 in FIG. 7. The remaining circuitry shown in FIG. 10 constitutes switches 56, 58.

AND gates 234 and 236 has as one of their required inputs the Q output from flip-flop 232. The second input to NAND gate 234 is the X command. The second input to AND gate 236 is the output of the X accumulator 50.

AND gates 238 and 240 respectively have as one of their inputs the Q output of flip-flop 230. The second input to these AND gates constitutes the respective Y command and output from the Y accumulator 52.

AND gates 242 and 244 have as one of their inputs a $\overline{Q}$ output from either flip-flop 230 or 232 applied through a NOR gate 246. A second input to NAND gate 242 is a Z command and to AND gate 244 is a Z accumulator 54 output.

The outputs of AND gates 234, 238, 242 are applied to an OR gate 250 completing switch 56. The output of the AND gates 236, 240 and 244 are applied to an OR gate 252 completing switch 58.

Sample switches 26 (76) are driven from the 1, 2 and 3 count outputs of the counter as indicated with NOR gates 146, 148, 150 of FIG. 7.

There has accordingly been described and shown herein a novel and useful numerical control drive signal generating system.

What is claimed is:

1. In a numerical control system,
    means for representing for each axis, the following error, or distance between present location and commanded location of a machine tool, as a binary digital number,
    a digital to analog converter having transfer characteristics determined by the values of the input digital numbers,
    means for measuring the value of each said following error digital number including means for counting the number of zeros solely in the most significant bit positions thereof without regard to bit values in other bit positions and producing an output indicative that the number of zeros exceed a predetermined number,
    means responsive to the value of the number indicated by said means for measuring for altering its value to obtain a desired digital to analog converter transfer characteristic including means for generating a number to be added to said following error number when the number of zeros in its most significant bit positions do not exceed said predetermined number, and
    means responsive to the output of said means for measuring indicative that the number of zeros do not exceed a predetermined number for adding thereto the number generated by said means for generating a number,
    means for applying said altered value digital number for each axis to said digital to analog converter, and
    means for utilizing the outputs of said digital to analog converter to move said machine tool table.

2. In a numerical control system as recited in claim 1 wherein said digital following error number is a binary number and has one digit position assigned to represent whether said number is a positive or a negative number,
    means for detecting whether a digital following error number is positive or negative and producing an indicative output when it is negative,
    means for complementing said digital following error number responsive to said indicative output,
    said means for measuring the value of each said following error number includes means for counting the number of zeros in the most significant bit positions of said digital following error number and producing an output indicative that the number of zeros exceed a predetermined number,
    means for generating a number to be added to said following error number when the number of zeros in its most significant bit positions do not exceed said predetermined number, and
    means responsive to the output of said means for measuring indicative that the number of zeros do not exceed a predetermined number for adding thereto the number generated by said means for generating a number.

3. In a numerical control system as recited in claim 1 wherein the output of said digital to analog converter includes:

a normally open switch means, a sample and hold circuit connected thereto, means responsive to the value of the number measured by said means for measuring exceeding a predetermined value to open and close said normally open switch at a first frequency, and means responsive to the value of the number measured by said means for measuring being less than said predetermined value to open and close said normally open switch means at a second frequency.

4. In a numerical control system means for representing for each axis, the following error, or distance between present location and commanded location of a machine tool table, as a digital number, a digital to analog converter having transfer characteristics determined by the values of the input digital numbers, an error register, means for entering into said error register the following error digital number for an axis, means for circulating the number in said error register, means for measuring the value of said number as it is circulated, means responsive to said measured value exceeding a predetermined amount for increasing the value of the number in said error register to obtain a desired transfer characteristic of said digital to analog converter, means for entering said number in said error register into said digital to analog converter, a normally open switch means for each axis connected to the output of said digital to analog converter, a different sample and hold circuit connected to each normally open switch means, means responsive to the measured value exceeding a predetermined amount for operating the normally open switch for an axis at a first frequency and responsive to the measured value being less than said predetermined amount for operating the normally open switch for an axis at a second frequency, and means for each axis for utilizing the output of a sample and hold circuit to drive said machine tool table.

5. In a numerical control system as recited in claim 4 wherein said digital following error number is a binary number, said means for measuring the value of said number as it is circulated includes means for counting the number of zeros in the most significant bit positions of said number and producing an output when the number of zeros exceed a predetermined number, means for generating a number to be added to said digital following error number, and means for adding said generated number to said following error number as it is circulated responsive to the output of said means for measuring indicative that the number of zeros do not exceed said predetermined number.

6. In a numerical control system as recited in claim 4 wherein said digital following error number has one digit position assigned to represent whether said number is positive or negative, means for detecting whether a following error number entered into said register is negative and producing an indicative output thereof, and means for complementing said digital following error number as it is circulated responsive to said indicative output.

* * * * *